United States Patent Office 3,467,420
Patented Sept. 16, 1969

3,467,420
LONGITUDINALLY ADJUSTABLE JOINT, FOR EXAMPLE, FOR OFFICE MACHINES
Harald Svensson, Svangsta, Sweden, assignor to Facit-Halda AB, Svangsta, Sweden, a Swedish joint-stock company
Filed Nov. 4, 1966, Ser. No. 592,035
Claims priority, application Sweden, Nov. 5, 1965, 14,291/65
Int. Cl. F16b 7/10, 7/00
U.S. Cl. 287—58     2 Claims

ABSTRACT OF THE DISCLOSURE

An adjustable-length joint or link having slots extending longitudinally of one of the two link elements and a sector-shaped opening in each element, the points of the two sectors lying on opposite sides of the longitudinal center line of the link and in transverse alignment when the link is at the midpoint of its range of length adjustment whereby rotary movement of a blade such as a screw-driver blade will shorten or lengthen the link. Screws extending through the slots in the overlying element and threaded into the underlying element serve to lock the link in adjusted position.

---

This invention relates to a longitudinally adjustable joint or the like, for example for office machines, comprising two elements adapted to be displaced relative one another in the longitudinal direction of the joint and locking means such as screws extending through slots to thereby lock the elements relative to one another, with plane surfaces of the elements abutting each other.

The invention is characterized in that each of the elements is provided with a recess or an opening which openings are so shaped and adapted to partially overlie one another in such a manner, that by wrenching or turning movements with a screw-driver or a like tool inserted through the recesses or openings the elements can be displaced relative to one another in the longitudinal direction when in their unlocked state.

By utilizing joints or the like manufactured according to the invention, for example in an office machine, it is possible to readily and accurately adjust the length or the position of different members of the machine in connection with the assembly of the machine or its adjusting at a later date.

The accompanying figures show by way of example an embodiment of the invention.

Figure 1:
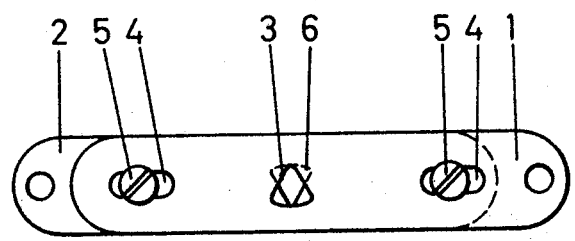
FIG. 1 is a top plan view of an adjustable length joint or limb.

The figures show a joint comprising an upper element 1 and a lower element 2 whereof the upper element 1 which is made of a thinner sheet metal is provided with a sector-shaped opening 3 and with two slots 4 extending in the longitudinal direction of the joint, which slots have a length somewhat exceeding the diameter of two locking screws 5 extending through the slots 4 and being threaded into the lower element 2 which for rendering possible several thread courses is made of a somewhat thicker sheet metal and which also is provided with a sector-shaped opening 6. The point of the opening 3 is directed in a direction opposite to the point of the opening 6, and the openings 3 and 6 are congruent.

Figure 2:
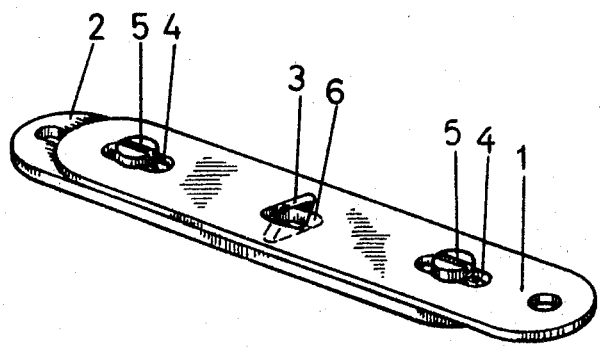
FIG. 2 is a perspective view of the joint of FIG. 1.

For adjusting the length of the joint, the locking screws 5 are first loosened somewhat whereafter a screw-driver is inserted from above according to FIG. 2 through the openings 3 and 6, the edge of the driver being transverse in relation to the longitudinal direction of the joint, whereafter by turning the screw-driver in one turning direction or the other the elements 1 and 2 can be moved in one or the other direction of their longitudinal extension. The length of the joint, thus, is adjusted to the desired value whereafter the locking screws are tightened again, preferably while maintaining the adjusted position of the joint by keeping the said screw-driver inserted into the openings 3 and 6.

For preventing a screw driver inserted into the openings 3 and 6 from having the tendency of jamming during the turning movement, the openings 3 and 6 are advantageously designed such, that their shape deviates from a circular sector, in that the radius of curvature is substantially greater and preferably twice as great as the distance between the intersection point of the lateral edge with the circumference and the intersection point of the lateral edges with one another.

The joint may also advantageously be provided with two or more pairs of recesses or openings, corresponding to the pair of openings 3, 6, in such a manner, that the different pairs are arranged with different central positions, whereby the range of adjustability of the joint in longitudinal direction is increased.

The joint can be connected to the other members of the machine in several ways known per se, for example by links or by screw- or weld-connection.

I claim:

1. A longitudinally adjustable joint or link, comprising, in combination, a first link element having at least two longitudinally spaced threaded openings therein, a second link element having a plane surface thereof abutting against a plane surface of said first element, at least two longitudinally extending slots in said second element, the transverse center line of each said slot registering with the transverse center line of a corresponding threaded aperture of said first element when said link is at the midpoint of its length adjustment, a screw extending through each said element and threaded into the corresponding threaded opening to lock said elements in an adjusted position and means for adjusting said link elements longitudinally relative to each other comprising a generally sector-shaped opening of substantially equal size in each link element, the central radious of each sector extending transversely and the angles of said sectors lying on opposite sides of the longitudianl center of the link, said central radii being in alignment when the link is in the midpoint of its range of adjustment whereby a blade inserted into said sector openings may be rotated to shorten or lengthen the overall link length.

2. A longitudinally adjustable joint or link as claimed in claim 1 wherein said generally sector-shaped openings have a radius of curvature equal to substantially twice the length of the sides.

References Cited

UNITED STATES PATENTS

| | | | |
|---|---|---|---|
| 789,344 | 5/1905 | Wattie | 287—58 |
| 1,097,185 | 5/1914 | Oehrle | 287—58 X |
| 1,652,677 | 12/1927 | McCoy et al. | 287—58 |

FOREIGN PATENTS

| | | |
|---|---|---|
| 1,215,841 | 11/1959 | France. |
| 109,796 | 2/1940 | Great Britain. |

CARL W. TOMLIN, Primary Examiner

DAVE W. AROLA, Assistant Examiner

U.S. Cl. X.R.

287—64